US009886672B2

(12) United States Patent
Wittliff

(10) Patent No.: US 9,886,672 B2
(45) Date of Patent: Feb. 6, 2018

(54) SYSTEM AND METHOD FOR CALCULATING FUEL ECONOMY

(71) Applicants:Bosch Automotive Service Solutions Inc., Warren, MI (US); Robert Bosch GmbH, Stuttgart (DE)

(72) Inventor: William W. Wittliff, Gobles, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 125 days.

(21) Appl. No.: 14/972,293

(22) Filed: Dec. 17, 2015

(65) Prior Publication Data

US 2016/0180612 A1     Jun. 23, 2016

Related U.S. Application Data

(60) Provisional application No. 62/093,327, filed on Dec. 17, 2014.

(51) Int. Cl.
    *G07C 5/08*     (2006.01)
    *G06Q 10/06*     (2012.01)
    *G07C 5/00*     (2006.01)
    *G05B 23/02*     (2006.01)

(52) U.S. Cl.
    CPC ............. *G06Q 10/06* (2013.01); *G07C 5/008* (2013.01); *G05B 23/0283* (2013.01)

(58) Field of Classification Search
    CPC ................................ G07C 5/08; G07C 5/0816
    See application file for complete search history.

(56) References Cited

U.S. PATENT DOCUMENTS

| | | | | |
|---|---|---|---|---|
| 8,082,774 B2* | 12/2011 | Watson | ................... | B60K 35/00 73/114.54 |
| 9,517,773 B2* | 12/2016 | Roos | ..................... | B60W 50/14 |
| 2012/0080251 A1* | 4/2012 | Ohashi | ..................... | B60K 1/04 180/65.31 |
| 2013/0151111 A1* | 6/2013 | Skelton | ................... | B60R 25/00 701/99 |
| 2016/0012657 A1* | 1/2016 | Reineccius | ............ | G06Q 20/22 705/39 |

\* cited by examiner

*Primary Examiner* — Yonel Beaulieu
*Assistant Examiner* — Martin A Weeks
(74) *Attorney, Agent, or Firm* — Maginot, Moore & Beck LLP

(57) ABSTRACT

A fuel economy calculator system for a vehicle including a fuel cell, a diagnostic port, and an ECU, the fuel economy calculator system includes a dongle configured to connect with the diagnostic port to enable the dongle to establish a wired communication link with the ECU, and a wireless device including a display unit, a memory storing program instructions and capacity data of the fuel cell, and a processor. The processor is configured to execute the program instructions to establish a link between the ECU and the wireless device, to receive a data set from the ECU via the connected dongle each time the ECU generates engine change state data, the data set including at least mileage data and remaining fuel data, to calculate fuel economy data of the vehicle based on the capacity data, a most recent data set, and a next most recent data.

17 Claims, 2 Drawing Sheets

SYSTEM AND METHOD FOR CALCULATING FUEL ECONOMY

This application claims the benefit of priority of U.S. provisional application Ser. No. 62/093,327, filed on Dec. 17, 2014 the disclosure of which is herein incorporated by reference in its entirety.

This disclosure relates generally to automotive diagnostic systems and particularly to automatically calculating and displaying the fuel economy of a vehicle based in part on data generated by an automotive diagnostic system.

BACKGROUND

In recent years, vehicles and the field of automotive maintenance have experienced rapid growth in computerized systems both within automotive vehicles and in computerized diagnostic tools that identify maintenance issues with the vehicles. For example, most modern vehicles include one or more computer systems that are often referred to as an electronic control unit (ECU). In some vehicles, the ECU controls and monitors the operations of numerous systems including, but not limited to, the engine, steering, tires, transmission, brakes, fuel delivery or battery level monitoring, and climate control systems. Some vehicles also include numerous sensors that monitor various aspects of the operation of the vehicle and generate sensor data. The ECU receives the sensor data and is configured to generate diagnostic trouble codes (DTCs) if the sensor data indicate that one or more systems in the vehicle may be failing or operating outside of predetermined parameters.

Many vehicles use a controller area network (CAN) vehicle bus to transmit data between the ECU and the onboard sensors and components in the vehicle. The CAN bus, or other equivalent data networks in a vehicle, provides a common communication framework between the ECU and the various sensors and systems in the vehicle. Additionally, the CAN bus or equivalent network enables communication between the ECU and external diagnostic tools.

Diagnostic tools are typically digital computers having communication ports and input/output devices configured to interface with the ECU via the CAN bus. Some diagnostic tools include display screens, which visually relay information to a mechanic and enable the mechanic to perform tests and send commands to the ECU. The ECU and the diagnostic tools interfaced therewith often use an industry standard protocol, such as a version of the on-board diagnostics (OBD) protocol, including the OBD-II protocol.

Some of the data generated by the ECU is of interest to the operator of the vehicle. The operator, however, typically does not desire to purchase the diagnostic tools used by service professionals that are commonly used to access the ECU data. Additionally, the typical diagnostic tools used by service professionals require at least some configuration to display the information that is of interest to the operator. For at least these reasons, the operator of the vehicle typically foregoes accessing the data of interest that is generated by the ECU.

Therefore, it is desirable to provide a method and system for an operator of a vehicle to conveniently access at least some of the data generated by the ECU.

SUMMARY

According to an exemplary embodiment of the disclosure, a method is disclosed for operating a fuel economy calculator system for calculating a fuel economy of a vehicle. The fuel economy calculator system includes a dongle and a wireless device. The vehicle includes a fuel cell, a diagnostic port, and an electronic control unit (ECU) electrically connected to the diagnostic port and operable to generate mileage data, remaining fuel data, and engine change state data. The method includes saving capacity data representing a capacity of the fuel cell in a memory of the wireless device, and establishing a wired communication link between the ECU and the dongle by connecting the dongle to the diagnostic port of the ECU. The method further including establishing a wireless communication link between the ECU and the wireless device via the connected dongle, sending a data set from the ECU to the wireless device via the connected dongle each time the ECU generates the engine change state data, the data set including at least the mileage data and the remaining fuel data. The method also includes calculating fuel economy data of the vehicle based on (i) the capacity data, a most recent data set, and a next most recent data set in response to the mileage data of the most recent data set being different from the mileage data of the next most recent data set, or (ii) the capacity data, the next most recent data set, and a prior data set in response to the mileage data of the most recent data set being equal to the mileage data of the next most recent data set, and rendering the calculated fuel economy data on a display of the wireless device as the fuel economy of the vehicle.

According to yet another exemplary embodiment of the disclosure, a fuel economy calculator system for a vehicle is disclosed. The vehicle includes a fuel cell, a diagnostic port, and an electronic control unit (ECU) electrically connected to the diagnostic port and operable to generate mileage data, remaining fuel data, and engine change state data. The fuel economy calculator system includes a dongle configured to connect with the diagnostic port to enable the dongle to establish a wired communication link with the ECU, and a wireless device including a display unit, a memory storing program instructions and capacity data of the fuel cell, and a processor. The processor is configured to execute the program instructions to establish a wireless communication link between the ECU and the wireless device via the connected dongle, to receive a data set from the ECU via the connected dongle each time the ECU generates the engine change state data, the data set including at least the mileage data and the remaining fuel data, to calculate fuel economy data of the vehicle based on (i) the capacity data, a most recent data set, and a next most recent data if the mileage data of the most recent data set is different from the mileage data of the next most recent data set, or (ii) the capacity data, the next most recent data set, and a prior data set if the mileage data of the most recent data set is equal to the mileage data of the next most recent data set, and to render the calculated fuel economy data on the display of the wireless device as a calculated fuel economy of the vehicle.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
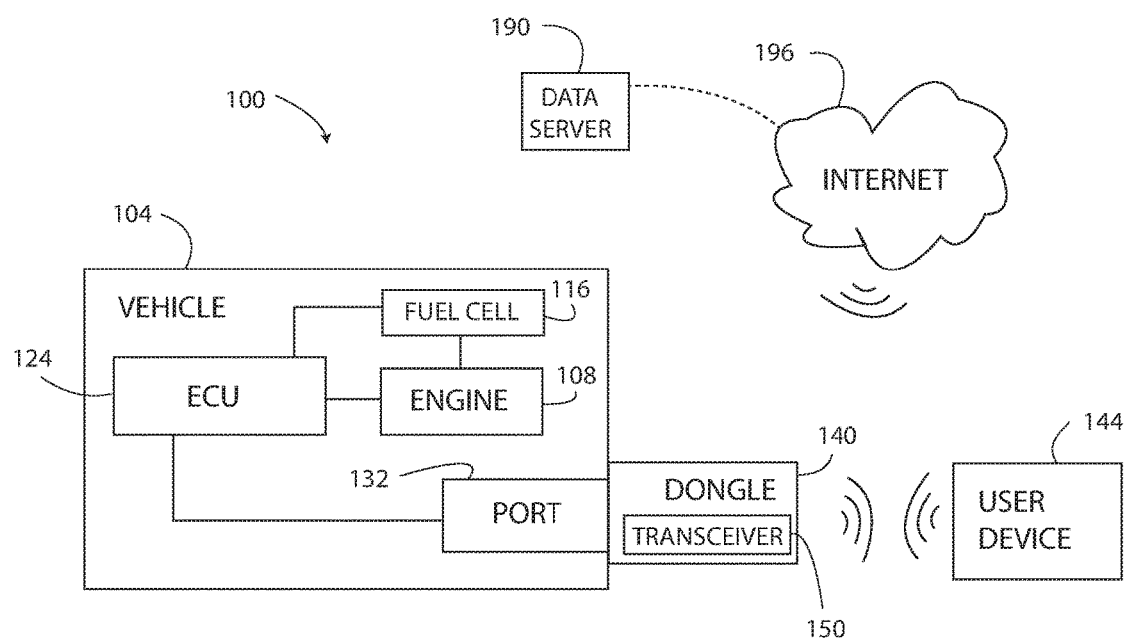
FIG. 1 is a block diagram of a vehicle, the Internet, a data server, and a user device including program instructions configured to execute a method of automatically calculating the fuel economy of the vehicle.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

As shown in FIG. 1, a fuel economy calculator system 100 is associated with a vehicle 104. The vehicle 104 includes an engine 108, a fuel cell 116, an ECU 124, and a diagnostic port 132. The vehicle 104 is representative of any type of vehicle including, but not limited to, passenger motor vehicles, commercial motor vehicles, airplanes, ships, and boats. The engine 108, in one embodiment, is an internal combustion engine that burns fuel stored in the fuel cell 116 to generate power for moving the vehicle 104.

The ECU 124 is a computer that is configured to monitor various sensors (not shown) that are associated with the engine 108, the fuel cell 116, and other components of the vehicle 104. The ECU 124 generates and stores data related to the operation of the vehicle 104. Exemplary data generated and stored by the ECU 124 includes mileage data, remaining fuel data, and engine change state data. The mileage data is based on the distance traveled by the vehicle 104 and may be stored in any desired format including miles or kilometers, for example. Typically, the mileage data is rendered on an odometer (not shown) of the vehicle 104. The remaining fuel data is based on a percentage or a quantity of fuel remaining in the fuel cell 116. The remaining fuel data is typically rendered on a fuel gauge (not shown) of the vehicle 104. The engine change state data indicates if the engine 108 has changed from an operating state to a non-operating state and from a non-operating state to an operating state. Accordingly, the engine change state data is generated whenever the engine is turned on and whenever the engine is turned off. In one embodiment, the ECU 124 is also configured to generate key cycle data, which also indicates when the engine has changed states. Thus, the ECU 124 may generate the engine change state data based on the key cycle data, in at least one embodiment. In another embodiment, the engine change state data is the same as the key cycle data.

The port 132, which is also referred to as a connector and/or an OBD connector, is typically located within an interior of the vehicle 104 in a position that is accessible by an operator of the vehicle. The port 132 is electrically connected to the ECU 124 and is a hardware interface for interfacing with the ECU. Accordingly, the data generated and stored by the ECU 124 is transmittable to a hardware device that is connected to the port 132. Additionally, data generated by a hardware device connected to the port 132 can be transmitted to the ECU 124 through the port 132.

The fuel economy calculator system 100 includes a dongle 140 and a user device 144. The dongle 140 is a hardware device that mates with or connects to the port 132 in order to establish a wired communication link between the dongle 140 and the ECU 124. When connected to the port 132, the dongle 140 is configured to send data to the ECU 124 and to receive data from the ECU 124. Additionally, the dongle 140 is configured to send data generated by the ECU 124 to the user device 144. In one embodiment, the dongle 140 is a vehicle communication interface (VCI) device that includes a transceiver 150 configured to transmit selected data generated by the ECU 124 to another hardware device, such as the user device 144. The dongle 140 is configured to obtain data from the ECU 124 via standard vehicle protocols, such as SAE-J1850 VPW, SAE-J1850 PWM, and ISO9141, as well as enhanced data. In another embodiment, the dongle 140 is an adaptor or a transceiver unit and is configured to obtain data from the ECU 124 and to transmit the obtained data to another device 144.

Figure 2:
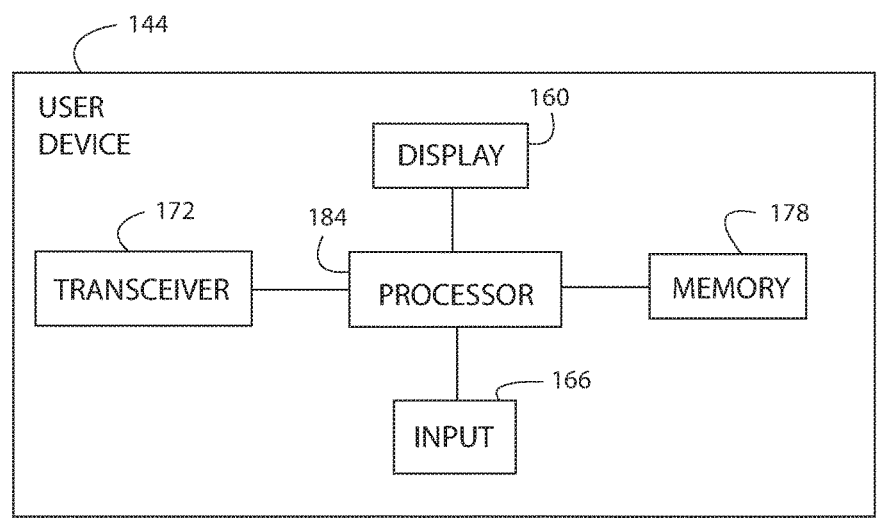
FIG. 2 is a block diagram of the user device of FIG. 1.

As shown in FIG. 2, the user device 144, which is also referred to herein as a wireless device, includes a display 160, an input device 166, a transceiver 172, and a memory 178 each of which is connected to at least one processor 184. The user device 144 is typically a cellular phone/mobile phone, a smartphone, a tablet computer, a portable device, a diagnostic tool, a projector, a wearable device, a human-body mountable device, or any other type of wireless device. In other embodiments, the user device 144 can be a computer unit, a television, a vehicle dash-board, or the like.

The display 160 is liquid crystal display (LCD) panel configured to display text, images, and other visually comprehensible data. The display 160, in another embodiment, is any display as desired by those of ordinary skill in the art, including, but not limited to, an active-matrix organic light-emitting diode display.

The input device 166 is a touchscreen applied over the display 160. The input device 166 is configured to respond to the touch of a finger or a stylus by generating input data that is sent to the processor 184. The input device 166 is configured to enable a user to enter text data and to manipulate objects shown on the display 160. In another embodiment, the input device 166 is a button, a keyboard, a microphone or any device configured to generate input data, as desired by those of ordinary skill in the art.

The transceiver 172, which is also referred to as a wireless transmitter and receiver, is operably connected to the processor 184 and is configured to wirelessly communicate with the transceiver 150 of the dongle 140 either directly or indirectly via a cellular network, a wireless local area network ("Wi-Fi"), a personal area network, and/or any other wireless network. Accordingly, the transceiver 172 is compatible with any desired wireless communication standard or protocol including, but not limited to, IEEE 802.11, IEEE 802.15.1 ("Bluetooth®"), Global System for Mobiles ("GSM"), and Code Division Multiple Access ("CDMA"). When the dongle 140 is connected to the port 132, the transceiver 172 is configured to communicate with the transceiver 150, such that a wireless communication link is established between the ECU 124 and the user device 166. In another embodiment, the user device 144 is electrically connected to the dongle 140 with a hardwired connection (not shown) configured to transfer data between the user device and the dongle.

In at least some embodiments, the user device 144 includes a GPS receiver (not shown) and/or is otherwise configured to receive signals and to determine position data based on a position of the user device 144 on the Earth using a satellite navigation system, such as the Global Positioning System ("GPS").

The processor 184 is configured to store program instructions (i.e. software) in the memory 178. The processor 184 is operably connected to the memory 178 and is configured to execute the program instructions for operating the components connected thereto, such as the display 160, the input device 166, and the transceiver 172.

In operation, the system 100 automatically determines the fuel economy (i.e. miles per gallon or kilometers per liter) of the vehicle 104 at least each time the engine changes states. Specifically, the user device 144 executes the program instructions to determine the fuel economy of the vehicle 104 with little to no operator intervention. To prepare the user device 144 for determining the fuel economy, the capacity of the fuel cell 116 is stored in the memory 178 as capacity data. In one embodiment, the operator of the vehicle 104 enters the capacity data using the input device 166 (i.e. the input device 166 generates input data corresponding to the capacity data) and then the capacity data is stored in the memory 178. In such an embodiment, no further operator configuration is required for determination of the fuel economy. In another embodiment, the ECU 124 transmits vehicle identification data to the user device 144 via the transceiver 150 of the dongle 140. After, receiving the vehicle data, the user device 144 queries a data server 190 accessible via the Internet 196 with the vehicle identification data, and the data server 190 responds by sending the capacity data of the fuel cell 116 to the user device 144. In this embodiment, no operator configuration is required for determination of the fuel economy other than pairing the user device 144 to the dongle 140.

Figure 3:
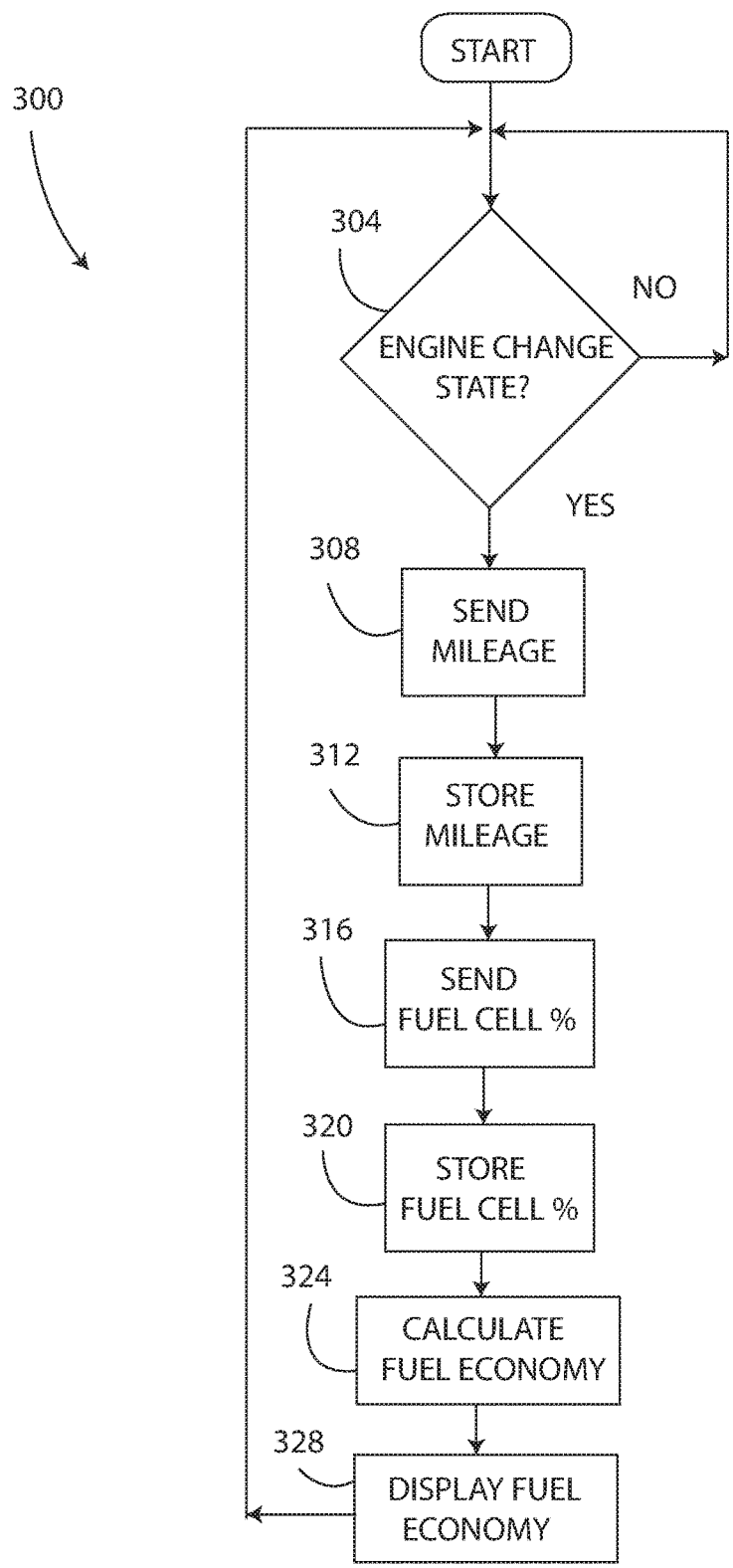
FIG. 3 is a flowchart illustrating an exemplary method of automatically calculating and displaying the fuel economy of the vehicle of FIG. 1.

After the capacity data is stored in the memory 178 and the user device 144 is paired to the dongle 140, the program instructions implement a method 300 shown by the flowchart of FIG. 3 for determining the fuel economy of the vehicle 104. First, as shown in block 304, the dongle 140 monitors the data generated by the ECU 124 to determine if the engine 108 has changed states. For example, the dongle 140 monitors the key cycle data generated by the ECU 124 or the engine change state data generated by the ECU 124.

As shown in blocks 308 and 316, if the user device 144 detects a change in state of the engine 108, the dongle 140 transmits a data set including at least mileage data and remaining fuel data from the ECU 124 to the user device 144. The mileage data is representative of the mileage that is typically displayed on an odometer of the vehicle 104 at the time of the detected change in state of the engine 108, and the remaining fuel data is representative of a percentage of fuel remaining in the fuel cell 116 at the time of the detected change in state of the engine 108. In blocks 312 and 320, when the data set is received by the user device 144, the processor 184 stores the mileage data and the remaining fuel data in the memory 178.

In addition to including the present mileage data and the remaining fuel data (i.e. the data sets), additional data may also be transmitted to the user device 144 at the time of the detected change in state of the engine 108, such as date and time data indicating when the mileage data and the remaining fuel data were determined, as well as location data, altitude data, and weather data each of which may impact fuel economy. The user device 144 may receive the location data, the altitude data, and the weather data from one or more of the ECU 124, a data server 190 connected to the Internet 196 (in response to a corresponding query), and/or a clock (not shown) internal to the user device 144. The additional data is stored in the memory 178 and at least some of the data may be rendered on the display 160 of the user device 144.

As described in block 324, when the memory 178 has stored at least two data sets the program instructions cause the user device 144 to calculate the fuel economy of the vehicle 104. Typically, the two most recent data sets (i.e. a most recent data set and a next most recent data set) are used to calculate the fuel economy. Specifically, to calculate the fuel economy, the program instructions cause the processor 184 to determine (i) delta present mileage data as a difference between the mileage data of the two most recent data sets, and (ii) delta remaining fuel data as a difference between the remaining fuel data of the two most recent data sets. Then, the processor 184 converts the delta remaining fuel data to a fluid measurement unit, such as a gallons or liters using the capacity data. Next, the processor 184 divides the delta present mileage data by the converted delta remaining fuel data to form fuel economy data, which is associated with the two most recent data sets and is stored in the memory 178. In this example, the mileage data of the most recent data set is different from the mileage data of the next most recent data set.

In block 328, the determined fuel economy is rendered on the display 160 of the user device 144 automatically shortly after the engine 108 changes states or anytime the user makes a request to display the data using the input 166.

Since, the method 300 generates a data set whenever the engine 108 is changed to the operational state and whenever the engine is changed to the nonoperational state, the method is configured to accurately determine the fuel economy of the vehicle 104 immediately following a refueling event regardless of how much fuel is added to the fuel cell 116 during the refueling event. For example, consider that the vehicle 104 is started and a first data set is generated and stored in the memory 178. The started vehicle 104 is then driven one hundred miles to a service station and then is changed to the nonoperational state. As soon as the vehicle 104 enters the nonoperational state a second data set is generated and the fuel economy is calculated by the processor 184 and rendered on the display 160, according to the process described above, using the first and second data sets which have different mileage data. Next, during the nonoperational state any amount of fuel is added to the fuel cell 116.

During refueling, the fuel cell 116 may be completely filled or only partially filled. Then, when refueling is complete, the engine 108 is changed to the operational state and a third data set is generated. In response to the change of state of the engine 108, the processor 184 starts to calculate the fuel economy using two most recent data sets (i.e. the second data set and the third data set); however, when the third data set is compared to the second data set, the processor 184 determines that the vehicle 104 has traveled zero miles and has gained some fuel, because the mileage data of the second and third data sets are equal and remaining fuel data are different. In response to determining that the two most recent data sets have equal mileage data and differing remaining fuel data, the processor 184 recognizes that a refueling event has occurred. To display an accurate fuel economy immediately following the refueling event, the processor 184 displays the most recent previously calculated fuel economy data, since the fuel economy of the vehicle is unchanged in response to the refueling event. Additionally or alternatively, the processor 184 calculates the fuel economy data based on the next most recent data set and a prior data set having mileage data that are different from the mileage data of the next most recent data set. In the example described above, the processor 184 calculates fuel economy data based on the first and the second data sets and ignores the third data set following the refueling event. Thus, the processor 184 displays the same fuel economy after the refueling event as was calculated before the refueling event, because no changes in fuel economy have occurred during the refueling. When the vehicle 104 is changed to the nonoperational state after driving away from the service station a fourth data set is generated. The processor 184 uses the third and fourth data sets to calculate another fuel economy value, because the mileage data of the third and fourth data sets are different. Recognition of the refueling event contributes to the method 300 being configured to accurately determine the fuel economy when any amount of fuel is added to the fuel cell 116.

In addition to calculating the fuel economy, the method 300 includes configuring the user device 144 to calculate and to store trip fuel mileage, tank mileage, mileage over a period of time, and a running average of fuel mileage, for example.

Operators of vehicles benefit by monitoring fuel economy. For example, an operator may choose to adjust their driving style to achieve an improved fuel economy. Also, by monitoring trends in fuel economy, an operator may be able to detect a vehicle problem. For example, a decline in fuel economy may indicate a vehicle problem.

The method 300 for determining fuel economy, as described herein, represents an advancement over fuel mileage calculators of the past. Specifically, in the past, fuel mileage calculators required the user to enter vehicle mileage before and after adding fuel to the fuel cell as well as the quantity of fuel consumed during the mileage entered. The amount of fuel had to be manually entered after fuel was added to the fuel cell. The past calculators made the assumption that the fuel cell was filled to the same level as when the beginning mileage was entered. Therefore, the past calculators did not allow for partially filling the fuel cell to calculate fuel mileage.

The method 300 disclosed herein does not require the user to manually enter the mileage driven or the fuel consumed. The method 300 is automatic and there is no user interaction required after the initial setup of the fuel cell 116 capacity data. Additionally, as described above, the method 300 accurately determines fuel economy even when the fuel cell 116 is not filled to the same level at each filling.

In another embodiment, the program instructions configure the user device 144 to dynamically or instantaneously determine the fuel economy of the vehicle 104. In this embodiment, instead of sending the mileage data and the remaining fuel data only when the engine changes state, the method causes the dongle 140 to periodically send the mileage data and the remaining fuel data even while the engine 108 is running. Thus, the fuel economy is calculated in the same manner as described above, but much more frequently. For example, the dongle 140 may send the data every second or every twenty seconds.

In yet another embodiment, the dongle 140 includes a processor, a memory, and the program instructions for determining the fuel economy according to the above-described method(s). In this embodiment, when the fuel economy is determined, the dongle transmits the fuel economy to the user device 144 for display on the display screen 160.

In a further embodiment, the fuel economy calculator system 100 is configured to compute the fuel economy when the present mileage data is unavailable by using "miles since code set" data, which is stored in the ECU 124. The miles since code set data includes mileage data that is initiated in response to a DTC or other code being generated by the ECU 124.

In another embodiment, the fuel economy calculator system 100 includes a module (not shown) configured to calculate instantaneous mileage using engine parameters.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a fuel economy calculator system for calculating a fuel economy of a vehicle, the fuel economy calculator system including a dongle and a wireless device and the vehicle including a fuel cell, a diagnostic port, and an electronic control unit (ECU) electrically connected to the diagnostic port and operable to generate mileage data, remaining fuel data, and engine change state data, the method comprising:
   saving capacity data representing a capacity of the fuel cell in a memory of the wireless device;
   establishing a wired communication link between the ECU and the dongle by connecting the dongle to the diagnostic port of the ECU;
   establishing a wireless communication link between the ECU and the wireless device via the connected dongle;
   sending a data set from the ECU to the wireless device via the connected dongle each time the ECU generates the engine change state data, the data set including at least the mileage data and the remaining fuel data;
   calculating fuel economy data of the vehicle based on (i) the capacity data, a most recent data set, and a next most recent data set in response to the mileage data of the most recent data set being different from the mileage data of the next most recent data set, or (ii) the capacity data, the next most recent data set, and a prior data set in response to the mileage data of the most recent data set being equal to the mileage data of the next most recent data set; and
   rendering the calculated fuel economy data on a display of the wireless device as the fuel economy of the vehicle.

2. The method of claim 1, wherein the ECU generates key cycle data, the method further comprising:
   determining that the ECU has generated the engine change state data by monitoring the key cycle data with the connected dongle.

3. The method of claim 1, wherein the ECU includes vehicle identification data, the method further comprising:
   receiving the vehicle identification data from the ECU with the wireless device via the connected dongle;
   querying a data server with the received vehicle identification data using the wireless device to determine the capacity data; and
   receiving the determined capacity data from the data server with the wireless device, such that no user configuration is required to determine the fuel economy data.

4. The method of claim 1, further comprising:
   generating the capacity data with an input of the wireless device in response to a user input.

5. The method of claim 1, further comprising:
   using the wireless device as a cellular phone.

6. The method of claim 1, further comprising:
   querying a data server to determine at least one of location data of the wireless device, altitude data of the wireless device, and weather data based on weather near the wireless device;
   receiving at least one of the determined location data, the determined altitude data, and the determined weather data with the wireless device; and rendering at least one of the received location data, the received altitude data, and the received weather data on the display.

7. A fuel economy calculator system for a vehicle including a fuel cell, a diagnostic port, and an electronic control unit (ECU) electrically connected to the diagnostic port and operable to generate mileage data, remaining fuel data, and engine change state data, the fuel economy calculator system comprising:
a dongle configured to connect with the diagnostic port to enable the dongle to establish a wired communication link with the ECU; and
a wireless device including a display unit, a memory storing program instructions and capacity data of the fuel cell, and a processor configured to execute the program instructions
to establish a wireless communication link between the ECU and the wireless device via the connected dongle,
to receive a data set from the ECU via the connected dongle each time the ECU generates the engine change state data, the data set including at least the mileage data and the remaining fuel data,
to calculate fuel economy data of the vehicle based on (i) the capacity data, a most recent data set, and a next most recent data set if the mileage data of the most recent data set is different from the mileage data of the next most recent data set, or (ii) the capacity data, the next most recent data set, and a prior data set if the mileage data of the most recent data set is equal to the mileage data of the next most recent data set, and
to render the calculated fuel economy data on the display of the wireless device as a calculated fuel economy of the vehicle.

8. The fuel economy calculator system of claim 7, wherein:
the ECU generates key cycle data, and
the processor is configured to execute the program instructions to determine that the ECU has generated the engine change state data by monitoring the key cycle data with the connected dongle.

9. The fuel economy calculator system of claim 7, wherein the ECU includes vehicle identification data, and the processor is configured to execute the program instructions
to receive the vehicle identification data from the ECU via the connected dongle, and
to query a data server with the received vehicle identification data to determine the capacity data, such that no user configuration is required to determine the calculated fuel economy data.

10. The fuel economy calculator system of claim 7, wherein the processor is configured to execute the program instructions
to receive user input data from an input of the wireless device, and
to generate the capacity data based on the user input data.

11. The fuel economy calculator system of claim 7, wherein the wireless device is configured as a cellular phone.

12. The fuel economy calculator system of claim 7, wherein the processor is configured to execute the program instructions
to query a data server to determine at least one of location data of the wireless device, altitude data of the wireless device, and weather data based on weather near the wireless device, to receive at least one of the determined location data, the determined altitude data, and the determined weather data, and
to render at least one of the received location data, the received altitude data, and the received weather data on the display.

13. A method of operating a fuel economy calculator system for calculating a fuel economy of a vehicle, the fuel economy calculator system including a dongle and a wireless device and the vehicle including a fuel cell, a diagnostic port, and an electronic control unit (ECU) electrically connected to the diagnostic port and operable to generate mileage data, remaining fuel data, and engine change state data, the method comprising:
saving capacity data representing a capacity of the fuel cell in a memory of the wireless device;
establishing a wired communication link between the ECU and the dongle by connecting the dongle to the diagnostic port of the ECU;
establishing a wireless communication link between the ECU and the wireless device via the connected dongle;
determining that the ECU has generated the engine change state data by monitoring the key cycle data with the connected dongle;
sending a data set from the ECU to the wireless device via the connected dongle each time the ECU generates the engine change state data, the data set including at least the mileage data and the remaining fuel data, the remaining fuel data corresponding to a quantity of fuel in the fuel cell;
calculating fuel economy data of the vehicle based on (i) the capacity data, a most recent data set, and a next most recent data set in response to the mileage data of the most recent data set being different from the mileage data of the next most recent data set, or (ii) the capacity data, the next most recent data set, and a prior data set in response to the mileage data of the most recent data set being equal to the mileage data of the next most recent data set, such that the calculated fuel economy is accurate when the fuel cell is completely refilled with fuel and when the fuel cell is only partially refilled with fuel; and
rendering the calculated fuel economy data on a display of the wireless device as the fuel economy of the vehicle.

14. The method of claim 13, wherein the ECU includes vehicle identification data, the method further comprising:
receiving the vehicle identification data from the ECU with the wireless device via the connected dongle;
querying a data server with the received vehicle identification data using the wireless device to determine the capacity data; and
receiving the determined capacity data from the data server with the wireless device, such that no user configuration is required to determine the fuel economy data.

15. The method of claim 13, further comprising:
generating the capacity data with an input of the wireless device in response to a user input.

16. The method of claim 13, further comprising:
using the wireless device as a cellular phone.

17. The method of claim 13, further comprising:
querying a data server to determine at least one of location data of the wireless device, altitude data of the wireless device, and weather data based on weather near the wireless device;
receiving at least one of the determined location data, the determined altitude data, and the determined weather data with the wireless device; and rendering at least one of the received location data, the received altitude data, and the received weather data on the display.

\* \* \* \* \*